(12) United States Patent
Lee

(10) Patent No.: US 7,337,978 B2
(45) Date of Patent: Mar. 4, 2008

(54) DUAL INTERFACE IC CARD

(75) Inventor: Kyeong Ku Lee, Seoul (KR)

(73) Assignee: YBL Co. Ltd., Seoul (KR)

( * ) Notice: Subject to any disclaimer, the term of this patent is extended or adjusted under 35 U.S.C. 154(b) by 243 days.

(21) Appl. No.: 11/206,339

(22) Filed: Aug. 18, 2005

(65) Prior Publication Data
US 2006/0054709 A1 Mar. 16, 2006

(30) Foreign Application Priority Data
Sep. 15, 2004 (KR) ........................ 10-2004-0073749

(51) Int. Cl.
*G06K 19/06* (2006.01)
(52) U.S. Cl. ...................................... 235/492; 235/488
(58) Field of Classification Search ................ 235/492, 235/493, 486, 488, 441; 257/728, 725, 737, 257/679
See application file for complete search history.

(56) References Cited

U.S. PATENT DOCUMENTS

| | | | |
|---|---|---|---|
| 6,363,860 B1* | 4/2002 | Andre ........................ 105/72.2 |
| 6,585,166 B1* | 7/2003 | Ookawa et al. ............. 235/492 |
| 6,637,664 B1* | 10/2003 | Yoshigi et al. .............. 235/492 |
| 6,881,605 B2* | 4/2005 | Lee et al. .................... 438/106 |
| 6,955,300 B1* | 10/2005 | Yoshigi et al. .............. 235/492 |
| 6,989,349 B2* | 1/2006 | Tatewaki et al. ............ 503/201 |
| 7,154,394 B2* | 12/2006 | Zhou ....................... 340/568.8 |
| 2002/0053735 A1* | 5/2002 | Neuhaus et al. ............ 257/728 |
| 2003/0085288 A1* | 5/2003 | Luu ........................... 235/492 |
| 2003/0230631 A1* | 12/2003 | Tsunoda et al. ............ 235/492 |
| 2004/0129785 A1* | 7/2004 | Luu ........................... 235/486 |
| 2006/0157567 A1* | 7/2006 | Baumann et al. ........... 235/451 |

* cited by examiner

*Primary Examiner*—Thien Minh Le
(74) *Attorney, Agent, or Firm*—Richard M. Goldberg

(57) ABSTRACT

The present invention relates to a Dual Interface IC card including a top layer, a bottom layer, an antenna embedding layer between the top and bottom layers and an IC chip module embedded in an IC chip module embedding hole. The antenna embedding layer has a groove in a rectangular shape at its one side where elastic plates are embedded in both sides of the groove. The IC chip module is inserted by applying an adhesive onto the antenna embedding layer or using an adhesive tape. Thus, the IC chip module is easily installed and not detached to give a good connection and a long time use.

4 Claims, 2 Drawing Sheets

DUAL INTERFACE IC CARD

BACKGROUND OF THE INVENTION

Field of the Invention

The present invention relates to a Dual Interface IC card, and more particularly, said Dual Interface IC card comprising a top layer, a bottom layer, an antenna embedding layer between said layers and an IC chip module embedded in an IC chip module embedding hole, and said antenna embedding layer has a groove in a rectangular shape at its one side where elastic plates are inserted at the both sides of the groove. The IC chip module embedded by applying an adhesive onto the antenna embedding layer or using a hot melt tape comprised heat-activated film. Thus, IC chip module is easily installed and not detached to give a good connection and a long time use.

An IC chip module is embedded in a contacting point with a antenna which is located in an antenna embedding layer formed between a top layer and a bottom layer. In general, the IC chip module is embedded in the contacting point by applying a silver-containing conductive adhesive to the contacting point. Such silver-containing conductive adhesive is used to maintain conductivity during a long time use. However, the IC chip module is readily detached due to the rapid loss of adhesive strength which results in a poor connection. Thus, there is a problem to replace the Dual Interface IC card with a new one and it is not economical. In order to solve the above problem, a method is used for soldering an IC chip module to a contacting point with the antenna. This method has many drawbacks of the IC chip module being melted when soldering, the operation being difficult to perform, environment problems by soldering and so on.

SUMMARY OF THE INVENTION

The present invention was designed to solve aforementioned problems. An object of the present invention is to provide a Dual Interface IC card which can easily attach an IC chip module, and solve poor connection problems resulting from IC chip module detachment even in long time use by embedding a conductive elastic compound metal plate into both ends of the antenna which is laid inside the IC card and adhering the IC chip to said metal plate.

The Dual Interface IC card according to the present invention comprises an antenna formed between a top layer and a bottom layer and an IC chip module connecting terminals combined with both ends of said antenna. Said IC chip module connecting the terminals is electrically connected with contacting points of said antenna via an elastic plate. The Dual Interface IC card according to the present invention further comprises an antenna embedding layer formed between said top layer and said antenna, a groove formed on said antenna embedding layer for embedding said elastic plate, and an IC chip module embedding hole formed in said top layer for embedding the IC chip module. If said elastic plate is embedded in said groove and said IC chip module is embedded in said IC chip module embedding hole, then one end of said elastic plate is contacted with the contacting point of said antenna and the other end of said elastic plate is contacted with said IC chip module connecting terminal.

When embedding the IC chip module with the Dual Interface IC card, a conductive elastic compound metal plate is embedded in contacting points of both sides of the antenna and the IC chip module is combined on the antenna embedding layer having a groove by using an adhesive or an hot melt tape comprised heat-activated film. Therefore, the Dual Interface IC card of the present invention does not provide a poor connection of the contacting points of the antenna with the IC chip module and detachment of the IC chip module even in long time use, as well as easy attachment of the IC chip module.

BRIEF DESCRIPTION OF THE DRAWINGS

The other objects and features of the present invention will be hereinafter explained in detail with reference to the accompanying drawings.

DETAILED DESCRIPTION OF THE INVENTION

Figure 1:
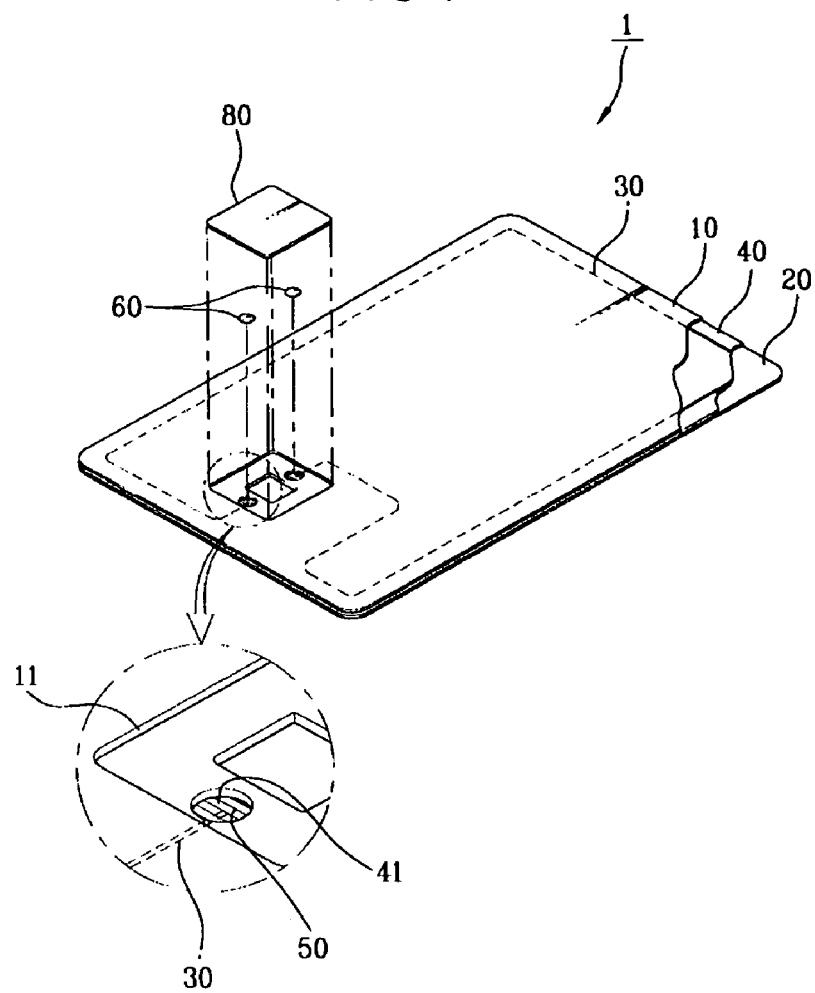
FIG. 1 is a perspective view of showing an unfolded state of Dual Interface IC card according to the present invention.
Figure 2:
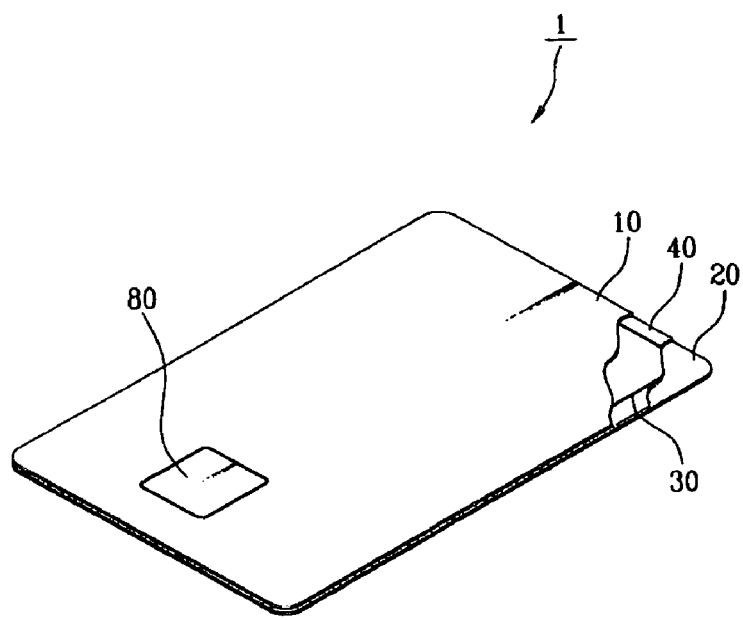
FIG. 2 is a perspective view of showing a folded state of Dual Interface IC card according to the present invention.
Figure 3:
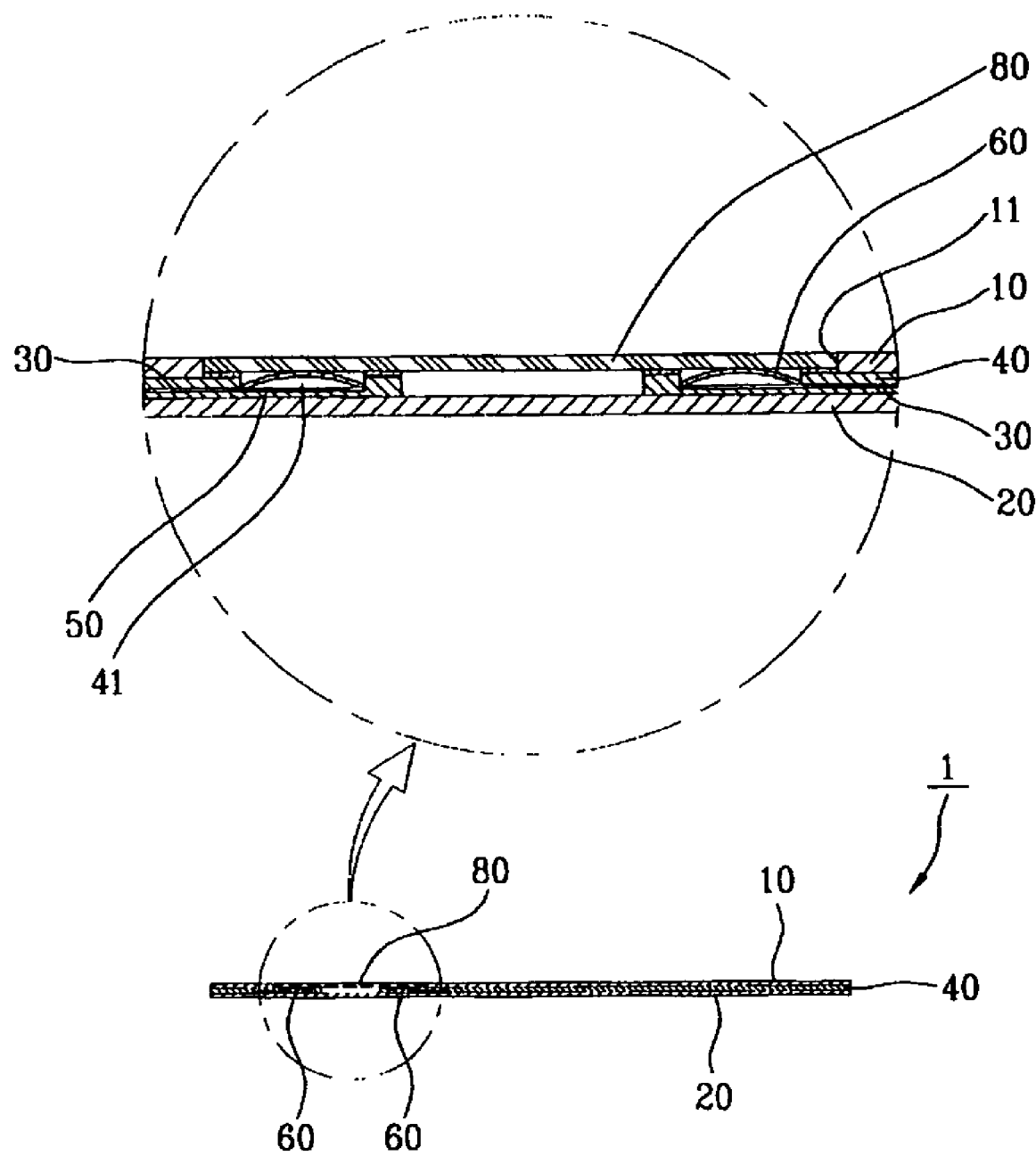
FIG. 3 is an illustrative cross-sectional view of Dual Interface IC card of the present invention.

Dual Interface IC card (1) according to the present invention comprises antenna (30) formed between top layer (10) and bottom layer (20) and IC chip module (80) connecting terminals combined with both ends of said antenna (30). Said IC chip module (80) connecting the terminals are electrically connected with contacting points (50) of said antenna (30) via elastic plate (60). The Dual Interface IC card according to the present invention further comprises antenna embedding layer (40) formed between said top layer (10) and said antenna (30), groove (41) formed on said antenna embedding layer (40) for embedding said elastic plate (60), and IC chip module embedding hole (11) formed in said top layer (40) for embedding IC chip module (80). If said elastic plate (60) is inserted into said groove (41) and IC chip module (80) is embedded in said IC chip module embedding hole (11), then one end of said elastic plate (60) is contacted with the contacting point of said antenna (30) and the other end of said elastic plate (60) is contacted with said IC chip module (80) connecting terminal.

In the Dual Interface IC card of the present invention, antenna (30) and antenna embedding layer (40) are formed between top layer (10) and bottom layer (20) of the card. Top layer (10) has IC chip module embedding hole (11) and antenna embedding layer (40) has groove (41). The girth of groove (41) is determined by antenna embedding layer (40). A hole in which antenna embedding layer (40) is removed is formed in groove (41). Elastic plate (60) which is electrically connected with contacting point (50) of said antenna (30) is made by conductive alloy metal and is mounted on contacting point (50) on groove (41) when combining with IC chip module (80). The one end of elastic plate (60) is contacted with contacting point (50) of said antenna (30) and the other end of elastic plate (60) is contacted with IC chip module (80) connecting terminal and thus electrically connected. Elastic plate (60) may be manufactured in circle, triangle or rectangular shapes. IC chip module (80) is completely attached to Dual Interface IC card (1) by fixing IC chip module (80) with an adhesive or an adhesive tape onto antenna embedding layer (40) formed around said groove (41).

As described above, Dual Interface IC card of the present invention is readily manufactured and gives safe connection of antenna (30) with IC chip module (80) and strong adhesion of IC chip module without detachment. Thus, Dual Interface IC card of the present invention can be used for a long time without replacement with new one and is very economical.

What is claimed is:

1. A Dual Interface IC card, comprising:
   a top layer,
   a bottom layer,
   an antenna formed between the top layer and the bottom layer,
   an IC chip module of dual interface cards,
   an elastic plate which electrically connects connecting terminals of said IC chip module with contacting points of said antenna,
   an antenna embedding layer formed between said top layer and said antenna,
   a groove formed in said antenna embedding layer for embedding said elastic plate, and
   an IC chip module embedding hole formed in said top layer for inserting said IC chip module, such that one end of said elastic plate is contacted with one contacting point of said antenna and the other end of said elastic plate is contacted with said IC chip module connecting terminal when said elastic plate is inserted into said groove and said IC chip module is embedded in said IC chip module embedding hole.

2. The Dual Interface IC card according to claim 1, in which said elastic plate is a compound metal plate.

3. The Dual Interface IC card according to claim 1, in which the girth of the groove formed in the antenna embedding layer is determined by said antenna embedding layer, and a hole where said antenna embedding layer is removed is formed in said groove.

4. The Dual Interface IC card according to claim 3, in which said IC chip module is adhered onto said antenna embedding layer formed by said groove by using an adhesive.

* * * * *